L. E. LEACH.
AERATOR.
APPLICATION FILED MAY 10, 1909.
937,159.
Patented Oct. 19, 1909.
2 SHEETS—SHEET 1.
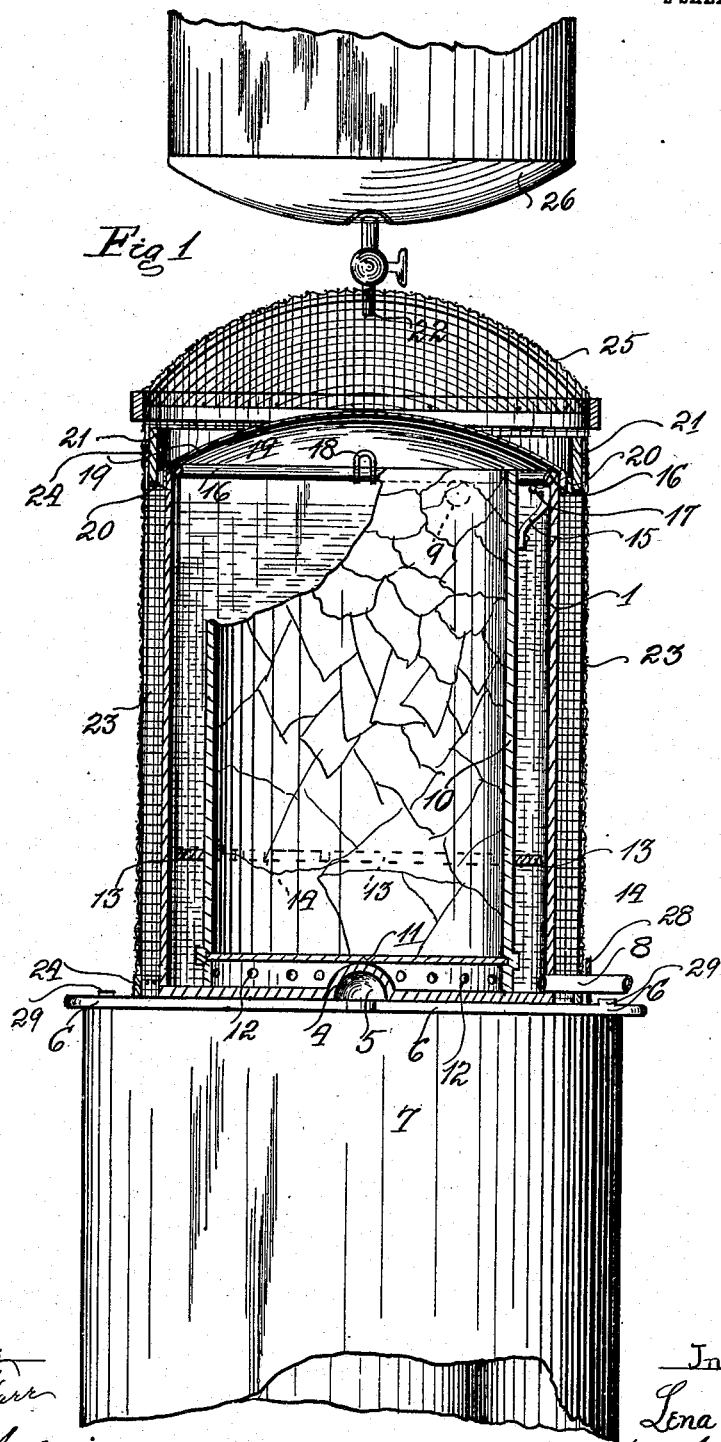

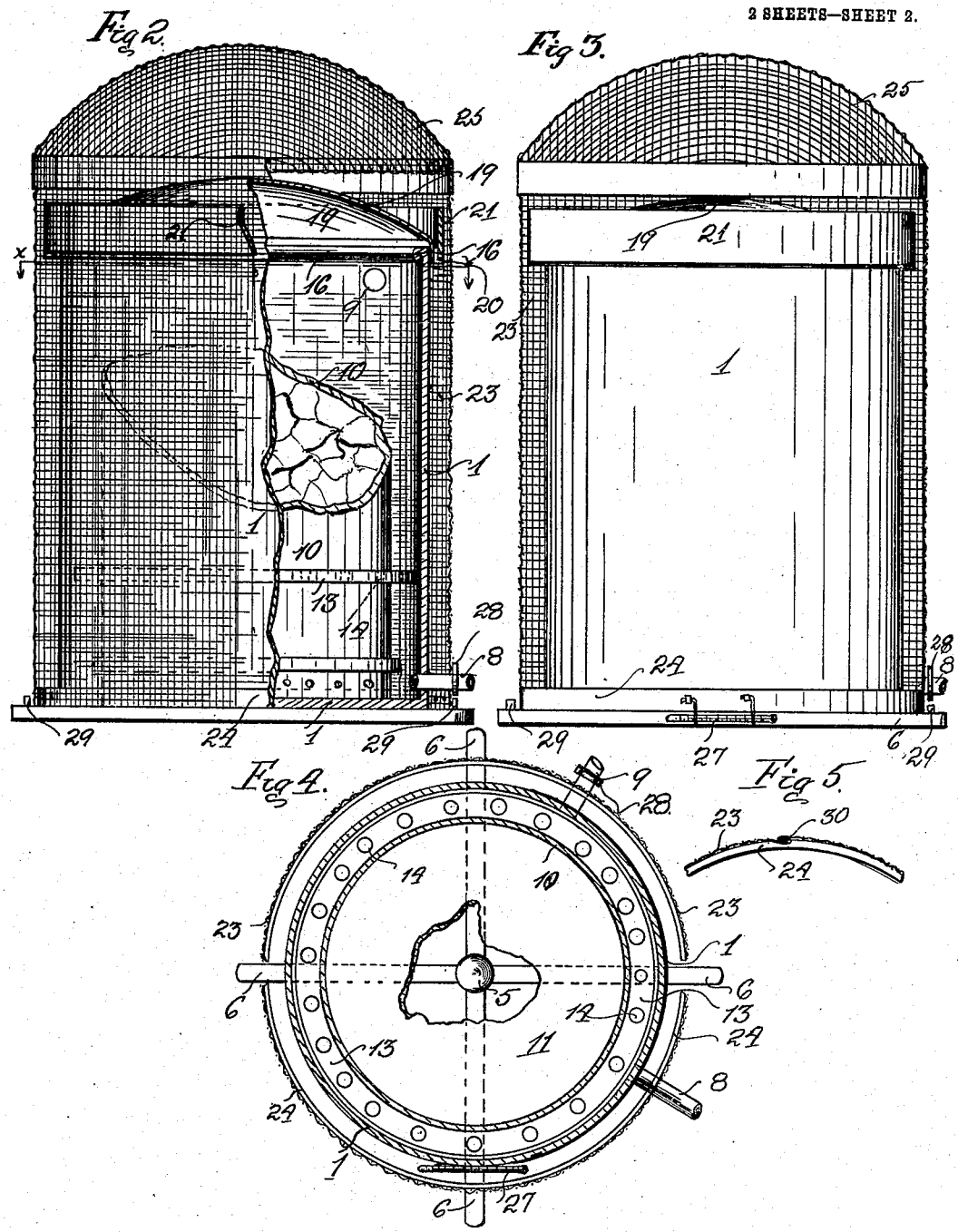

ions in Aerators,
UNITED STATES PATENT OFFICE.

LENA E. LEACH, OF VENICE, CALIFORNIA.

AERATOR.

937,159.  Specification of Letters Patent.  Patented Oct. 19, 1909.

Application filed May 10, 1909. Serial No. 495,171.

To all whom it may concern:

Be it known that I, LENA E. LEACH, a citizen of the United States, residing at Venice, in the county of Los Angeles and State of California, have invented certain new and useful Improvements in Aerators, of which the following is a specification.

This invention relates to a milk cooler, and has particular reference to a device for aerating milk for the purpose of extracting the animal warmth therefrom.

One of the objects of this invention is to provide a simple and above all, sanitary aerator, which in a device of calculated dimensions gives the greatest surface area for the flow of the milk, whereby the cooling of the milk takes place uniformly and thoroughly, avoiding in this manner the mixing of the uncooled milk with that already cooled, and the eventual coagulation or curdling of the same by reason of the presence of milk from which the natural heat has not been extracted.

Another object of this invention is to provide a simple and economical device for cooling milk, containing no creases or projecting corners which give lodgment to the milk proteids, and which, becoming rancid, vitiate and contaminate the purity of the milk flowing over the aerator during the process of cooling.

To prevent the accumulation of spores and atmospheric animalculæ with which the warm milk is prone to become infected while still possessed of the natural heat, it is necessary to not only extract the heat but also to reduce the temperature of the milk to a degree sufficient to forestall the propagation of the animal life contained in the milk. In order to effectually accomplish this end, the reduction of the temperature must occur almost simultaneously with the exposition of the warm milk to the atmosphere, and to this end I have contrived the present invention, by means of which the milk is at the first impact converted into a thin film or sheet and remains in that condition during the entire process of cooling.

A further object of this invention is to provide a milk cooler in which the temperature of the exposed cooling surface may be controlled at will, whereby to prevent too quick a dissolution of the refrigerating medium where such is employed.

This invention finally contemplates the provision of a cooler in which a cooling medium may be continuously circulated and in which the current of the cooling agent is distributed in such manner that it is in constant agitation whereby the absorptive tendencies of the cooling medium are considerably increased and maintained.

With these and other objects in view, this invention consists of the features, details of construction, and combination of parts, as will be described in connection with the accompanying drawings and then be more particularly pointed out in the claims.

In the drawings, Figure 1, is a vertical section of the cooler, showing the ice tank partly broken, the water tank and the screen; also fragments of the service tank containing the milk, and the receiving tank for the cooled milk at the bottom of the cooler. Fig. 2, is an elevation of the same, partly in section. Fig. 3, is an elevation of the same, showing a thermometer provided at the bottom of the water tank. Fig. 4, is a transverse section on lines $x$—$x$ Fig. 2, looking in the direction of the arrow and Fig. 5, is a fragmentary view showing the method of securing together the ends of the screen.

Specifically referring to the drawings, 1, designates a water tank, the center of the bottom of which tank is socketed as shown at 4, to accommodate a knob 5, formed integral with a four or more armed support 6, arranged to be set on the top of the receiving tank 7, for the cooled milk. An inlet pipe 8, is arranged to convey water to the inside of this tank 1, and the overflow or escape of excess water is afforded by the outlet passage 9, at or near the top of said tank 1. Disposed approximately centrally of said tank, 1, is an ice tank 10, having its bottom 11, elevated to a plane on line with the apex of said knob 5. That portion of the tank 10, below the bottom 11, thereof, is provided with a series of perforations 12, the purpose of which is to divide the incoming flow of water and thereby increase the circulation, so that the distribution of water, occurring equally at all points within the space formed by the water and ice tanks, exercises its cooling effect about every portion of the periphery of the tanks. To still further cause a wider and more thorough dispersion of the water and to increase the distribution of new water as well as of that which has been cooled by having the greater portion or all of its caloric units extracted through the agency of the ice within the ice tank 10, I provide an annular disk 13, about the periphery of the inner or ice tank 10, which disk has a series of perforations 14. This disk extends to within a short distance from the inside of the outer or water tank 1, so that the intervening space between the disk periphery and that of the water tank separates the ascending water into a separate current.

The influx of water through the inlet pipe 8, forcing its way through the perforations 12, contained on the bottom of the inner tank 10, and also through the perforations 14, of the disk 13, may lift the tank 10, within the water container 1, or the buoyancy of the inner tank, when the supply of ice is depleted or not sufficient to overbalance the pressure of the water, rising may remove the convex dome or cover 19 of the water tank, and to avoid this I have provided resilient springs 15 which are riveted to the outside of the inner or ice tank 10, and which when the said tank 10 is inserted in the tank 1, spring outwardly and engage the bead 16, formed integral with the upper edge of the tank 1. Said springs are provided with slightly projecting tangs 17, extending slightly beyond the bead 16, by which means the withdrawal of said springs from the said bead is facilitated, when the removal of the inner ice tank 10 is desired. 18 designates a bail fastened to the bead of the tank 10 whereby to readily remove the same. Onto the edge of said lid 19, are secured lips 20 which are arranged to support a ring 21, encircling the convex dome or cover 19. This ring is intended to catch the splashing milk drops which are liable to be spattered about by the impact of the flowing milk upon the said dome of the cooling tank.

The milk descending from the faucet 22, of the service tank 26, strikes the dome 19 approximately in the center, at which point, on account of the rotund contour thereof, it spreads in a thin film or sheet while coursing down along the outside of the tank 1. The curvature of the entire construction in avoidance of all joints, offers to the flowing milk the greatest area possible to be obtained, when caused to flow over the dome or cover of the cooler, and the cooling of the liquid begins with the first impact upon the dome, the temperature being gradually reduced to the desired degree, as indicated by the thermometer hung from the bottom edge of the outside tank. The ice in the ice tank 10, cools the inflowing water which has extracted from the milk flowing over the outside of the tank all of the thermal units naturally therein contained, and which on this account has or may become warm. To offset this as well as to prevent the too speedy dissolution of the ice in the tank 10, I cause the water to flow constantly into the tank 1, and thereby carry off the heat from the milk while at the same time keeping the temperature of the tank at a normal degree or such a point necessary for the prevention of the propagation of the animal life in the warm milk.

The evenness of the temperature of the tank may be governed by the regulation of the amount of water into the tank 1. In some instances it may be preferable to force air through the inlet pipe 8 instead of water, as where the warm water from the hydrant too rapidly liquefies the ice, when it becomes necessary to frequently replenish the ice supply which adds materially to the cost of operation. The entire cooling apparatus is incased in a screen 23, the body of which is normally held taut by spring bands 24, fastened to the inside thereof. A screened cap 25 fits over the body portion of the screen, and the spout or faucet 22 of the distributing or service tank 26 fits into an opening provided therefor in the said cap 25. In this manner the milk in its travel over the cooling area of the aerator, is protected against floating dust particles and flies, and also against the carelessness of the dairy attendants. The thermometer 27 is hung in a direct line with the stream of the milk which strikes the thermometer and registers the temperature of the milk.

On the inlet pipe 8, is a washer 28, provided for the purpose of preventing the milk from following said pipe, and a like provision is made on the armed support 6, consisting of lugs 29.

The screen is cylindrical in shape, and the edges thereof are reversely bent or curved as seen at 30, Fig. 5. By this arrangement the screen ends may be only temporarily fastened, the spring bands above referred to, serving to hold the interlocked edges firmly in position when the screen is in use. When cleaning of the aerator becomes necessary, the screen ends may readily be unlocked, in which condition it may be hung on the wall or stored in a sterilized place until again called into use.

What I claim, is:

1. An aerator for fluids, comprising a tank having a dome arranged to spread the fluids delivered thereon into a thin film or sheet, a refrigerator within but isolated from said tank, a service pipe connected with said water tank, and means to cause an even distribution of water within said water tank.

2. An aerator for fluids, comprising a tank having a dome arranged to spread the fluids into thin films or sheets, a water inlet for said tank, an overflow for said tank, an ice tank within said water tank, a service pipe connected with the water tank at the bottom thereof, and means on said refrigerating tank but isolated from said water tank to distribute the water within said water tank.

3. An aerator for fluids, comprising a tank having a dome arranged to spread the fluids, a water inlet for said tank, and a refrigerating tank within said water tank, said refrigerating tank being provided with means to divide the incoming water into separate currents.

4. An aerator for milk, comprising a water tank, an ice tank within said water tank but spaced therefrom, the bottom of said ice tank being perforated to cause the circulation of water thereabout, a perforated disk on said ice tank, and a dome on said water tank to cause an even distribution of the milk to all parts of the outside of the water tank.

5. An aerator for milk, comprising a water circulating tank, an ice tank within said water tank having at the bottom periphery thereof a series of perforations arranged to separate the inflowing water into individual currents, means on said tank to normally hold said tank against the pressure of the water, and a dome fitting said water tank and arranged to cause the milk to spread in a thin film to all sides of the tank.

6. An aerator for milk comprising a water circulating tank having an inlet, an ice tank within said water tank, means on said tank to cause a distribution of the inflowing water, a dome shaped lid fitting said water tank and arranged to cause the milk to travel in a thin film over all the portions of the aerator, and means on said lid to catch the splashing drops of milk.

7. An aerator for milk comprising a water circulating tank having an inlet, an ice tank within said water tank, means on said tank to cause a dispersion of the inflowing water into separate streams, a dome shaped lid fitting on the top of said water tank and arranged to cause the milk to travel in a thin film or sheet over all the portions of the aerator, and a ring loosely mounted on said dome to catch the splashing drops of milk.

8. An aerator for milk comprising a water circulating tank, an ice tank within said water tank, a convex cover for said water tank arranged to deliver the milk in a thin sheet to the outside of the water tank, in combination with a screen inclosure for said aerator, and means to hold said screen taut.

9. An aerator for milk comprising a water circulating tank, an ice tank within said water tank, a convex cover for said water tank arranged to deliver the milk in a thin film to all sides of the water tank, in combination with a cylindrical screen, and a plurality of spring bands fastened to said screen to hold said screen taut.

10. In combination with a receiving tank and a service tank, a support arranged to rest upon said receiving tank, said support having a knob, an aerator comprising a water circulating tank arranged to rest on said support, said water tank being provided on the bottom thereof with a socket arranged to fit over said knob, an ice tank within said water tank provided with a series of perforations, means to normally hold said ice tank against the pressure of the water in the said water tank, a convex cover for both said water and ice tanks, a ring loosely mounted on said cover to catch the splashing drops of milk, and a cylindrical screen incasing the entire aerator.

11. An aerator for milk, comprising a water circulating tank, an ice tank within said water tank, a convex cover for both said water and ice tanks, and means loosely mounted on said cover to catch the splashing drops of milk.

12. An aerator for milk comprising a water circulating tank, an ice tank within said water tank but spaced therefrom to form a water chamber, a milk distributing cover for said water tank, a ring loosely mounted on said cover to catch splashing drops of milk, and a screen inclosing said water tank and cover.

In testimony whereof I affix my signature in the presence of two witnesses.

LENA E. LEACH.

Witnesses:
 RALPH C. FARR,
 STEPHEN L. SULLIVAN.